(12) United States Patent
Ben-Hamo

(10) Patent No.: US 7,957,296 B2
(45) Date of Patent: Jun. 7, 2011

(54) APPARATUS FOR AND METHOD OF DETECTING LOSS OF SIGNAL IN A RADIO FREQUENCY CABLE

(75) Inventor: Oren Ben-Hamo, Rehovot (IL)

(73) Assignee: Intel Corporation, Santa Clara, CA (US)

( * ) Notice: Subject to any disclaimer, the term of this patent is extended or adjusted under 35 U.S.C. 154(b) by 1159 days.

(21) Appl. No.: 11/619,115

(22) Filed: Jan. 2, 2007

(65) Prior Publication Data

US 2008/0160973 A1 Jul. 3, 2008

(51) Int. Cl.
*G01R 31/08* (2006.01)
(52) U.S. Cl. ........................ 370/242; 370/252
(58) Field of Classification Search .................. 370/242, 370/252, 485, 241, 243, 244, 245, 248
See application file for complete search history.

(56) References Cited

U.S. PATENT DOCUMENTS

| | | | |
|---|---|---|---|
| 6,523,038 B1 * | 2/2003 | Iida et al. | 1/1 |
| 6,556,562 B1 * | 4/2003 | Bhagavath et al. | 370/352 |
| 6,804,262 B1 | 10/2004 | Vogel et al. | |
| 7,058,007 B1 * | 6/2006 | Daruwalla et al. | 370/216 |
| 2003/0224835 A1 | 12/2003 | Everett et al. | |
| 2004/0178801 A1 * | 9/2004 | Hart et al. | 324/637 |
| 2006/0225109 A1 * | 10/2006 | Seo | 725/100 |

* cited by examiner

*Primary Examiner* — Brian D Nguyen
(74) *Attorney, Agent, or Firm* — grossman, Trucker, Perrealt & Pfleger, PLLC

(57) ABSTRACT

A novel apparatus and method of detecting loss of signal events in RF cable. The loss of signal may be caused malicious cable cuts, inadvertent disconnects, loss of signal from the cable head-end or for any other reason. The invention is particular applicable to use in cable modems which provide cable service, Internet service and telephone service to subscriber premises including both homes and businesses. All RF channels are scanned and the signal power of each is measured and compared to a threshold. If the signal power on all channels is below the threshold, then it is concluded that a "cable signal loss" event has occurred. The telephone line originating in the cable modem is shut down which causes the alarm system connected thereto to generate an alert.

18 Claims, 4 Drawing Sheets

APPARATUS FOR AND METHOD OF DETECTING LOSS OF SIGNAL IN A RADIO FREQUENCY CABLE

FIELD OF THE INVENTION

The present invention relates to the field of data communications and more particularly relates to an apparatus for and method of detecting the loss of signal in a radio frequency (RF) cable.

BACKGROUND OF THE INVENTION

Cable modems are well known in the art. A cable modem is a type of modem that provides access to a data signal sent over the cable television infrastructure. Cable modems are primarily used to deliver broadband Internet access, taking advantage of unused bandwidth on a cable television network. In 2005 there were over 22.5 million cable modem users in the United States alone.

A cable modem is a network appliance that enables high speed data connections to the internet via data services provided by the local cable company. Data from the home is sent upstream on a carrier that operates on the 5 MHz to 42 MHz band of the cable spectrum. Downstream data is carried on a 88 MHz to 860 MHz band. The cable modem system can have additional networking features such as Voice over IP (VoIP), wireless connectivity or network switch or hub functionality.

The term cable Internet access refers to the delivery of Internet service over the cable television infrastructure. The proliferation of cable modems, along with DSL technology, has enabled broadband Internet access in many countries. The bandwidth of cable modem service typically ranges from 3 Mbps up to 40 Mbps or more. The upstream bandwidth on residential cable modem service usually ranges from 384 kbps to 30 Mbps or more. In comparison, DSL tends to offer less speed and more variance between service packages and prices. Service quality is also far more dependent on the client's location in relation to the telephone company's nearest central office or Remote Terminal.

Users in a neighborhood share the available bandwidth provided by a single coaxial cable line. Therefore, connection speed varies depending on how many people are using the service at the same time. In most areas this has been eliminated due to redundancy and fiber networks.

With the advent of Voice over IP telephony, cable modems are also be used to provide telephone service. Many people who have cable modems have opted to eliminate their Plain Old Telephone Service (POTS). An alternative to cable modems is the Embedded Multimedia Terminal Adapter (EMTA). An EMTA allows multiple system operators (MSOs) to offer both High Speed Internet and VoIP through a single piece of customer premise equipment. A multiple system operator is an operator of multiple cable television systems.

Many cable companies have launched Voice over Internet Protocol (VoIP) phone service, or digital phone service, providing consumers a true alternative to standard telephone service. Digital phone service takes the analog audio signals and converts them to digital data that can be transmitted over the fiber optic network of the cable company. Cable digital phone service is currently available to the majority of U.S. homes with a large number of homes are now subscribing. The number of homes subscribing is currently growing by hundreds of thousands each quarter. One significant benefit of digital phone service is the substantial consumer savings, with one recent study saying residential cable telephone consumers could save an average of $135 or more each year.

A block diagram illustrating prior art cable and telephone access to a subscriber premises is shown in FIG. 1. The example system, generally referenced 10, comprises a subscriber premises (e.g., residence, business, etc.) 22 that is adapted to receive both cable and telephone service. Cable service is provided by the local cable provider wherein the cable signal originates at the cable head end facility 12 and is transmitted over RF cable 18 to the subscriber premise 22 where it terminates at the cable POP 28. One or more televisions, set-top boxes, or other cable ready appliances are 24 are connected to the cable box 28 via RF cable wiring 34.

Telephone service is provided by the local telephone company. Telephone 26 are connected to the telephone POP 30 via the internal 2-wire telephone wiring 32. The telephone POP is connected to the public switched telephone network (PSTN) via a local access line 20 which terminates in the nearest central office (CO) 16. Note that the system 10 thus provides cable and telephone services provided by different entities. The two systems (cable and telephone) are not related at the premises and do not depend on one another.

In many premises, an alarm system 36 is connected to the 2-wire telephone wiring. The alarm system is tied into the telephone system for use by the alarm system to dial out in the event of an alarm indication to a central monitoring station. If the phone line is currently in use when an alarm condition arises, the alarm system is operative to disconnect the call and grab the phone line for its own use. In this manner, the transmission of the alarm indication is not delayed because the phone line was in use.

Thus, in the event that the RF cable is cut, the alarm system continues to function and is still able to dial out in the case of an alarm condition. If, on the other hand, the telephone local access line 20 were cut, the alarm system would not be able to use the telephone network to dial out to the central monitoring station. When the alarm system detects the loss of the telephone line, it sounds an audible alarm and/or attempts to contact the central monitoring station via alternate means. For this reason, some residences and many businesses utilize cellular phones connected to the alarm system as an alternate communication mechanism. In the event the telephone local access line is cut, the alarm system can still dial out over the cellular phone. Note that any other wireless or alternative communications means may be used as well (e.g., RF radio, etc.).

A block diagram illustrating prior art cable only access to a subscriber premises is shown in FIG. 2. The example system, generally referenced 40, comprises a subscriber premises (e.g., residence, business, etc.) 46 that is adapted to receive service only from the local cable company (i.e. no telephone service from the local telephone company). Cable service is provided by the local cable provider wherein the cable signal originates at the cable head end facility 42 and is transmitted over RF cable 44 to the subscriber premise 46 where it enters a splitter 48. One output of the splitter goes to the televisions, set top boxes, and other cable appliances via internal cable wiring 66.

The other output of the splitter comprises the data portion of the signal which is input to the cable modem 62. The cable modem is adapted to provide both Ethernet and USB ports. Typically, a router 56 is connected to the Ethernet port. One or more network capable computing devices 52, e.g., laptops, PDAs, desktops, etc. are connected to the router 56 via internal Ethernet network wiring 54. In addition, the router may comprise or be connected to a wireless access point that provides a wireless network (e.g., 802.11b/g/a) throughout the subscriber premises.

The cable modem also comprises a subscriber line interface card (SLIC) 64 which provides the signals and functions of a conventional local loop to the plurality of installed telephone devices 60 via internal 2-wire telephone wiring 58. In particular, it generates call progress tones including dial tone, ring tone, busy signals, etc. that are normally provided by the local loop from the CO. Since the telephone deices 60 are not connected to the CO, the SLIC in the cable modem must provide these signals in order that the telephone devices operate correctly.

In a traditional analog telephone system, each telephone or other communication device (i.e. subscriber unit) is typically interconnected by a pair of wires (commonly referred to as tip and ring or together as subscriber lines, subscriber loop or phone lines) through equipment to a switch at a local telephone company office (central office or CO). At the CO, the tip and ring lines are interconnected to a SLIC which provides required functionality to the subscriber unit. The switches at the central offices are interconnected to provide a network of switches thereby providing communications between a local subscriber and a remote subscriber.

The SLIC is an essential part of the network interface provided to individual analog subscriber units. The functions provided by the SLIC include providing talk battery (between 5 VDC for on-hook and 48 VDC for off-hook), ring voltage (between 70-90 VAC at a frequency of 17-20 Hz), ring trip, off-hook detection, and call progress signals such as ringback, busy, and dial tone.

A SLIC passes call progress tones such as dial tone, busy tone, and ringback tone to the subscriber unit. For the convenience of the subscriber who is initiating the call, these tones normally provided by the central office give an indication of call status. When the calling subscriber lifts the handset or when the subscriber unit otherwise generates an off hook condition, the central office generates a dial tone and supplies it to the calling subscriber unit to indicate the availability of phone service. After the calling subscriber has dialed a phone number of the remote (i.e. answering) subscriber unit, the SLIC passes a ring back sound directed to the calling subscriber to indicate that the network is taking action to signal the remote subscriber, i.e. that the remote subscriber is being rung. Alternatively, if the network determines that the remote subscriber unit is engaged in another call (or is already off-hook), the network generates a busy tone directed to the calling subscriber unit.

The SLIC also acts to identify the status to, or interpret signals generated by, the analog subscriber unit. For example, the SLIC provides –48 volts on the ring line, and 0 volts on the tip line, to the subscriber unit. The analog subscriber unit provides an open circuit when in the on-hook state. In a loop start circuit, the analog subscriber unit goes off-hook by closing, or looping the tip and ring to form a complete electrical circuit. This off-hook condition is detected by the SLIC (whereupon a dial tone is provided to the subscriber). Most residential circuits are configured as loop start circuits.

Also connected to the cable modem 62 is the alarm system 68. The alarm system is connected to the cable modem via 2-wire telephone wiring 58. Under normal conditions, the alarm system does not know that it is not connected to a CO that is part of the PSTN. In the event that the RF cable 44 is cut or disconnected, however, not only is cable service cut off but telephone service as well. This is because the telephone voice conversations are transmitted over the RF cable using VoIP. Even though the RF cable is cut and voice calls cannot be made, the alarm system does not react by sounding an alarm and/or attempting to communicate to the central monitoring station via alternate communication means such as cellular or other wireless mechanism. This is because the SLIC in the cable modem continues to present the normal tip and ring voltage levels and telephone call progress tones. Thus, the alarm system does not know that the RF cable was cut or disconnected and cannot be used to call a central monitoring station for help. In this second example, the alarm system will alert only if the telephone wiring is cut whereby the connection between the alarm system and the cable modem SLIC is severed or disconnected.

It is thus desirable to have a mechanism that overcomes the disadvantages of the prior art by having the alarm system sound and/or communicate an alert when the RF cable to the subscriber premises is cut or disconnected.

SUMMARY OF THE INVENTION

The present invention is a novel apparatus and method of detecting loss of signal events in RF cable. The loss of signal may be caused malicious cable cuts, inadvertent disconnects, loss of signal from the cable head-end or for any other reason. The invention is particular applicable to use in cable modems which provide cable service, Internet service and telephone service to subscriber premises including both homes and businesses.

In operation, the tuner within a cable modem system is operative to convert the RF signal received over the RF cable to an IF frequency. The processor is operative to measure the IF signal power received from the tuner. If no RF signals are present on any of the input RF channels, then an indication (e.g., "no RF signal") is sent to the SLIC to shutdown the telephone line. Upon receipt of such an indication, the SLIC removes the voltage from the telephone lines and ceases to supply any call progress tones such as dial tone, ringback, busy, etc. The alarm system, in response, triggers an alert and sounds an audible alarm and/or informs the monitoring station of the loss of signal.

To aid in understanding the principles of the present invention, the description is provided in the context of a cable modem adapted to receive an RF feed from a cable head-end and to distribute video, Internet and telephony to a subscriber premises. It is appreciated, however, that the invention is not limited to use with any particular communication device or standard and may be used in optical, wired and wireless applications. Further, the invention is not limited to use with a specific technology but is applicable to any situation where it is desired to provide an indication on ordinary telephone lines of the loss of an input RF signal.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention, a method of detecting cable cuts in a cable modem connected to a radio frequency (RF) cable having a plurality of channels, the method comprising the steps of scanning each channel in the plurality of channels and measuring the signal power level thereof and concluding that a cable cut has occurred if the signal power level detected for each channel is below a threshold.

There is also provided in accordance with the present invention, an apparatus for detecting cable cuts in a voice cable modem connected to a radio frequency (RF) cable having a plurality of channels comprising means for scanning each channel in the plurality of channels and measuring the signal power level thereof and means for generating a cable cut indication if the signal power level detected for each channel is below a threshold.

There is further provided in accordance with the present invention, a cable modem comprising a tuner coupled to an RF cable having a plurality of channels, the tuner operative to scan each channel in the plurality of channels, a cable modem processor coupled to the tuner and the SLIC, the cable modem processor operative to measure the signal power present on each channel and to generate a cable cut indication if the signal power level detected for each channel is below a threshold and a subscriber line interface card (SLIC) operative to output conventional telephone signals onto a telephone line and to shutdown the telephone line in response to receipt of the cable cut indication.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
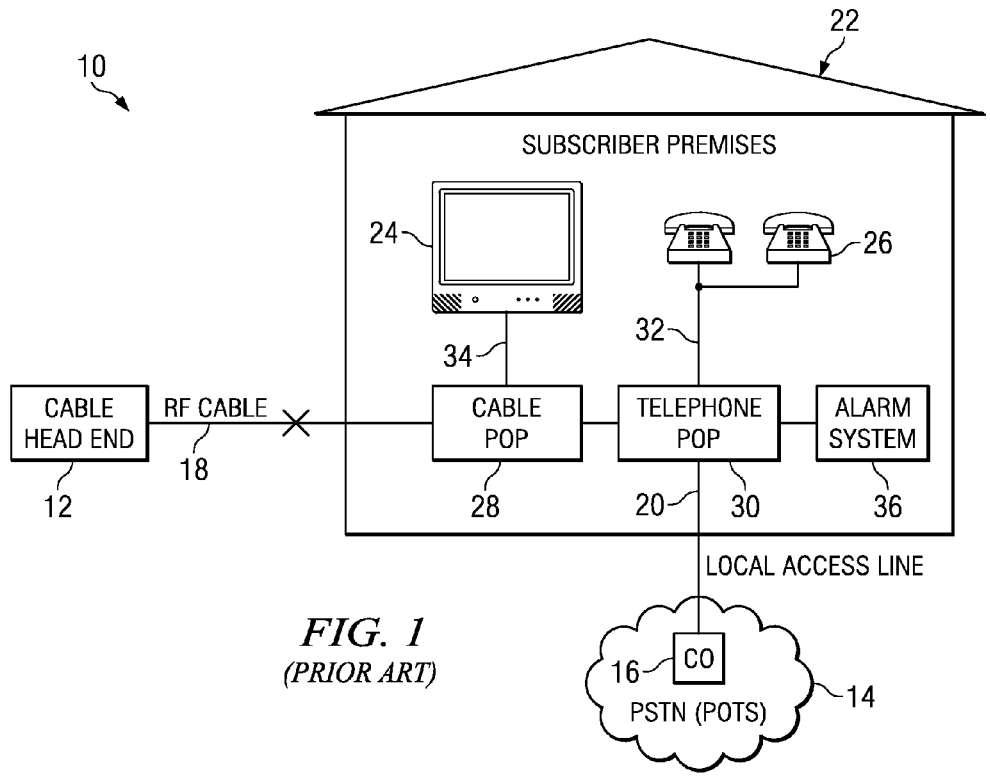
FIG. 1 is a block diagram illustrating prior art cable and telephone access to a subscriber premises.
Figure 2:
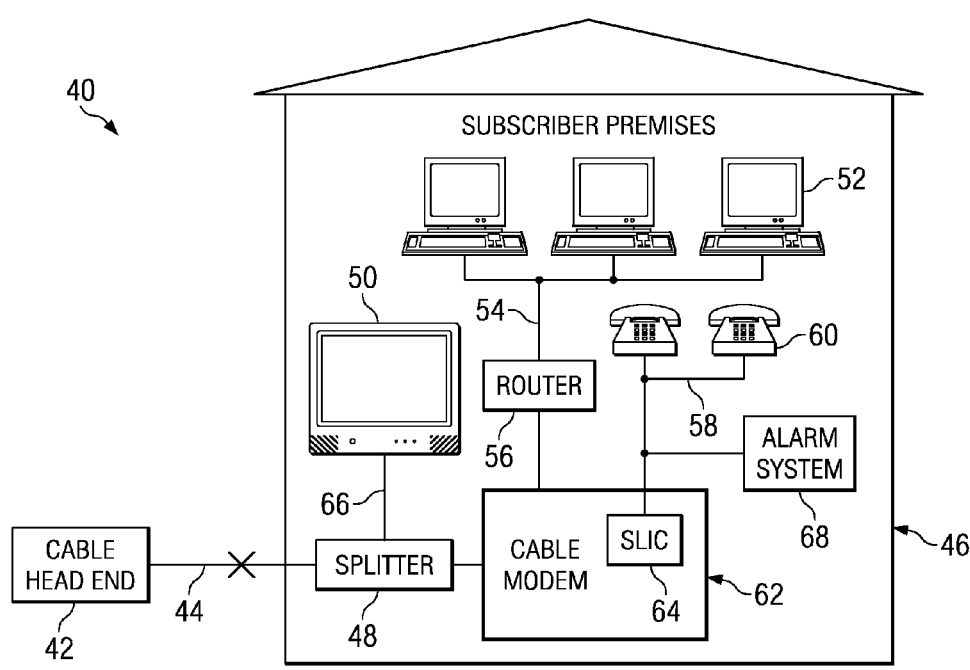
FIG. 2 is a block diagram illustrating prior art cable only access to a subscriber premises.

The following notation is used throughout this document.

| Term | Definition |
|---|---|
| AC | Alternating Current |
| ASIC | Application Specific Integrated Circuit |
| ATM | Asynchronous Transfer Mode |
| CMTS | Cable Modem Termination System |
| CO | Central Office |
| CPU | Central Processing Unit |
| DC | Direct Current |
| DHCP | Dynamic Host Control Protocol |
| DOCSIS | Data Over Cable Service Interface Specification |
| DSL | Digital Subscriber Line |
| DSP | Digital Signal Processor |
| DVR | Digital Video Recorder |
| EEROM | Electrically Erasable Read Only Memory |
| EMTA | Embedded Multimedia Terminal Adapter |
| FPGA | Field Programmable Gate Array |
| HDL | Hardware Description Language |
| IC | Integrated Circuit |
| IF | Intermediate Frequency |
| IP | Internet Protocol |
| MAC | Media Access Control |
| MSO | Multiple System Operator |
| PC | Personal Computer |
| PDA | Personal Digital Assistant |
| POP | Point of Presence |
| POTS | Plain Old Telephone Service |
| PSTN | Public Switched Telephone Network |
| QoS | Quality of Service |
| RAM | Random Access Memory |
| RF | Radio Frequency |
| ROM | Read Only Memory |
| SLIC | Subscriber Line Interface Card |
| SONET | Synchronous Optical Network |
| TV | Television |
| USB | Universal Serial Bus |
| VoIP | Voice over IP |
| WAN | Wide Area Network |

DETAILED DESCRIPTION OF THE INVENTION

The present invention is a novel apparatus and method of detecting loss of signal events in RF cable. The loss of signal may be caused malicious cable cuts, inadvertent disconnects, loss of signal from the cable head-end or for any other reason. The invention is particular applicable to use in cable modems which provide cable service, Internet service and telephone service to subscriber premises including both homes and businesses.

To aid in understanding the principles of the present invention, the description is provided in the context of a cable modem adapted to receive an RF feed from a cable head-end and to distribute video, Internet and telephony to a subscriber premises. It is appreciated, however, that the invention is not limited to use with any particular communication device or standard and may be used in optical, wired and wireless applications. Further, the invention is not limited to use with a specific technology but is applicable to any situation where it is desired to provide an indication on ordinary telephone lines of the loss of an input RF signal.

Note that throughout this document, the term communications device is defined as any apparatus or mechanism adapted to transmit, or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof.

The term cable modem is defined as a modem that provides access to a data signal sent over the cable television infrastructure. The term voice cable modem is defined as a cable modem that incorporates VoIP capabilities to provide telephone services to subscribers.

Cable Cut Detection System

Figure 3:
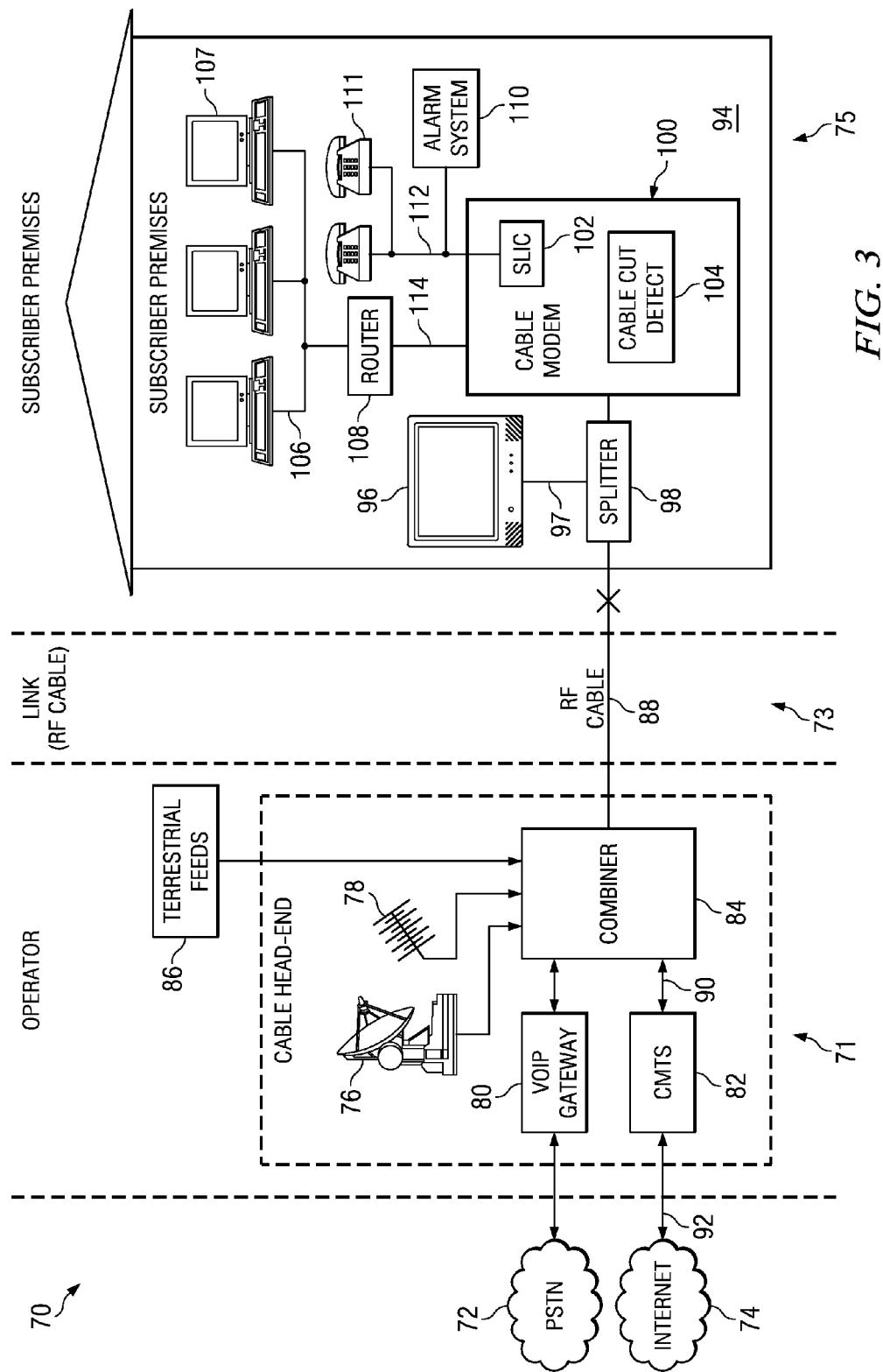
FIG. 3 is a block diagram illustrating a cable modem system incorporating the cable cut detection mechanism of the present invention.

A block diagram illustrating a cable modem system incorporating the cable cut detection mechanism of the present invention is shown in FIG. 3. The system comprises an operator portion 71 connected to the public switched telephone network (PSTN) 72 and the Internet 74 or other wide area network (WAN), a link portion 73 comprising the RF cable 88 and a subscriber portion 75 comprising the subscriber premises 94.

The operator portion 71 comprises the cable head-end 77 which is adapted to receive a number of content feeds such as satellite 76, local antenna 78 and terrestrial feeds 86, all of which are input to the combiner 84. The cable head-end also comprises the voice over IP (VoIP) gateway 80 and Cable Modem Termination System (CMTS) 82. The combiner merges the TV programming feeds with the RF data from the CMTS.

The Cable Modem Termination System) is a computerized device that enables cable modems to send and receive packets over the Internet. The IP packets are typically sent over Layer 2 and may comprise, for example, Ethernet or SONET frames or ATM cell. It inserts IP packets from the Internet into MPEG frames and transmits them to the cable modems in subscriber premises via an RF signal. It does the reverse process coming from the cable modems. A DOCSIS-compliant CMTS enables customer PCs to dynamically obtain IP addresses by acting as a proxy and forwarding DHCP requests to DHCP servers. A CMTS may provide filtering to protect against theft of service and denial of service attacks or against hackers trying to break into the cable operator's system. It may also provide traffic shaping to guarantee a specified quality of service (QoS) to selected customers. A CMTS may also provide bridging or routing capabilities.

The subscriber premises 94 comprises a splitter 98, cable appliances 96 such as televisions, DVRs, etc., cable modem 100, router 108, PCs or other networked computing devices 107, telephone devices 111 and alarm system 110. Cable service is provided by the local cable provider wherein the cable signal originates at the cable head end facility 77 and is transmitted over RF cable 88 to the subscriber premise 94 where it enters splitter 98. One output of the splitter goes to the televisions, set top boxes, and other cable appliances via internal cable wiring 97.

The other output of the splitter comprises the data portion of the signal which is input to the cable modem 100. The cable modem is adapted to provide both Ethernet and USB ports. Typically, a router 108 is connected to the Ethernet port via Ethernet cable 114. One or more network capable computing devices 107, e.g., laptops, PDAs, desktops, etc. are connected to the router 108 via internal Ethernet network wiring 106. In addition, the router may comprise or be connected to a wireless access point that provides a wireless network (e.g., 802.11b/g/a) throughout the subscriber premises.

The cable modem also comprises a subscriber line interface card (SLIC) 102 which provides the signals and functions of a conventional local loop to the plurality of installed telephone devices 111 via internal 2-wire telephone wiring 112. In particular, it generates call progress tones including dial tone, ring tone, busy signals, etc. that are normally provided by the local loop from the CO. Since the telephone deices 111 are not connected to the CO, the SLIC in the cable modem must provide these signals in order that the telephone devices operate correctly.

The cable modem also comprises the cable cut detect mechanism 104 of the present invention. The cable cut detector is operative to scan the entire RF input from the RF cable looking for evidence of a cable cut or disconnect. If it concludes that the RF cable has been cut, it generates an indication that disconnects the 2-wire connection to the telephone wiring 112. The disconnection is sensed by the alarm system which causes it to generate an alert (e.g., sound an audible alarm and/or contact the monitoring station via alternate communication means).

Voice Cable Modem Incorporating Cable Cut Detection System

Figure 4:
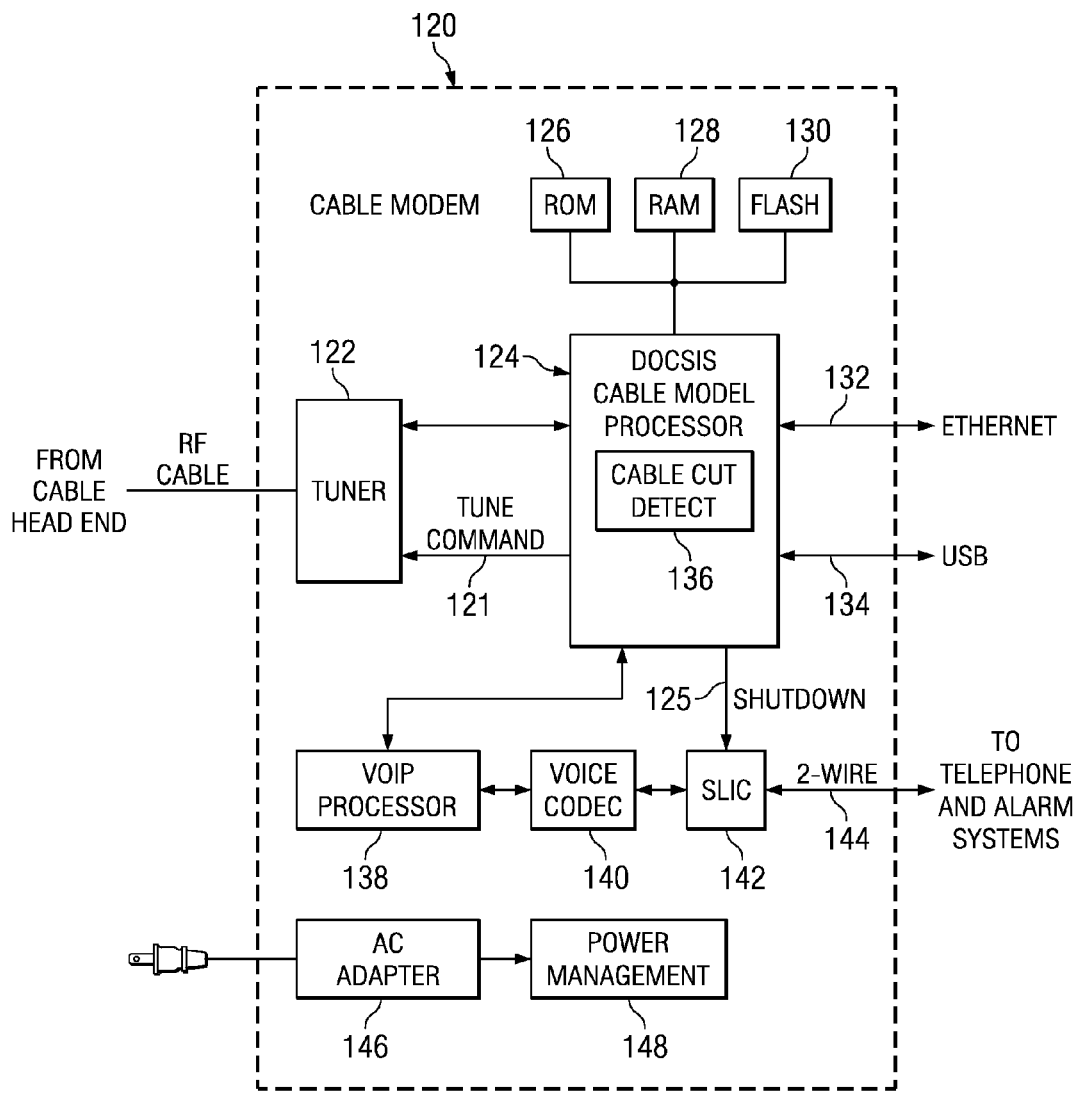
FIG. 4 is a block diagram illustrating the cable modem of FIG. 3 in more detail incorporating the cable cut detection mechanism of the present invention.

A block diagram illustrating the cable modem of FIG. 3 in more detail incorporating the cable cut detection mechanism of the present invention is shown in FIG. 4. The cable modem, generally referenced 120, comprises a tuner 122, DOCSIS compatible processor 124 incorporating the cable cut detection mechanism 136 of the present invention, VoIP processor 138, voice codec 140, SLIC 142, AC adapter 146, power management circuit 148, ROM 126, RAM 128 and FLASH memory 130.

In operation, the cable modem processor 124 is the core chip set which in the example presented herein comprises a central single integrated circuit (IC) with peripheral functions added. The voice over IP (VoIP) processor 138 implements a mechanism to provide phone service outside the standard telco channel. Chipset DSPs and codecs 140 add the functionality of POTS service for low rate voice data. A SLIC 142 generates the appropriate line voltages and call progress tones, e.g., dial tone, ring tone, busy tone, ringback tone, etc. The 2-wire telephone line 144 originating from the SLIC is connected to the internal phone system and to the alarm system.

Connectivity is provided by a standard 10/100/1000 Mbps Ethernet interface 132, USB port 134 or with additional chip sets, such as wireless 802.11a/b/g. The network functions may also include a router or Ethernet switch core. Note that the Ethernet MAC and PHY is typically integrated into the cable modem processor 124.

In the example embodiment presented herein, the tuner is operative to convert the RF signal received over the RF cable to an IF frequency. The processor is operative to measure the IF signal power received from the tuner. If no RF signals are present on any of the input RF channels, then an indication (e.g., "no RF signal") is sent to the SLIC to shutdown the telephone line. Upon receipt of such an indication, the SLIC removes the voltage from the telephone lines and ceases to supply any call progress tones such as dial tone, ringback, busy, etc.

The cable modem 120 comprises a processor 124 which may comprise a digital signal processor (DSP), central processing unit (CPU), microcontroller, microprocessor, microcomputer, ASIC or FPGA core. The cable modem also comprises static read only memory (ROM) 126, dynamic main memory 128 and FLASH memory 130 all in communication with the processor via bus 123.

The magnetic or semiconductor based storage device 128 (i.e. RAM) is used for storing application programs and data. The cable modem comprises computer readable storage medium that may include any suitable memory means, including but not limited to, magnetic storage, optical storage, semiconductor volatile or non-volatile memory, biological memory devices, or any other memory storage device.

Software adapted to implement the cable cut detection mechanism of the present invention is adapted to reside on a computer readable medium, such as a magnetic disk within a disk drive unit. Alternatively, the computer readable medium may comprise a floppy disk, removable hard disk, Flash memory 130, EEROM based memory, bubble memory storage, ROM storage 126, distribution media, intermediate storage media, execution memory of a computer, and any other medium or device capable of storing for later reading by a computer a computer program implementing the system and methods of this invention. The software adapted to implement the cable cut detection mechanism of the present invention may also reside, in whole or in part, in the static or dynamic main memories 128 or in firmware within the processor of the computer system (i.e. within microcontroller, microprocessor or microcomputer internal memory).

Figure 5:
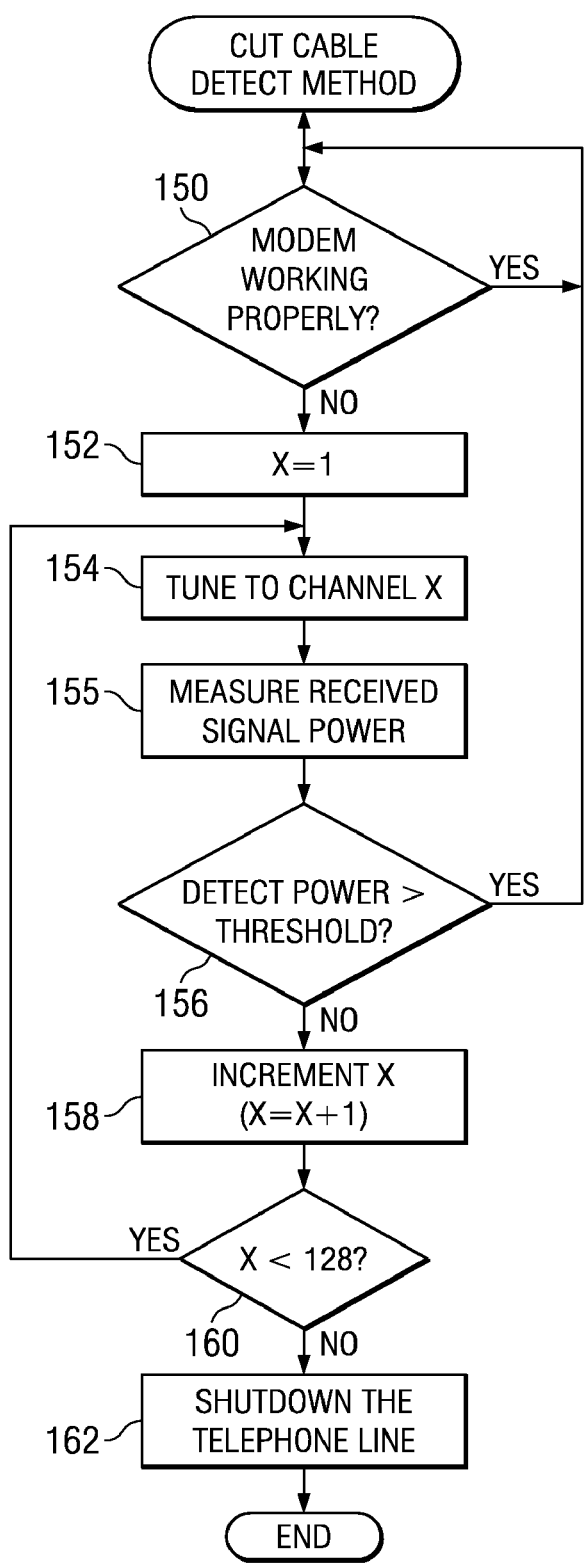
FIG. 5 is a flow diagram illustrating the cable cut detection method of the present invention.

A flow diagram illustrating the cable cut detection method of the present invention is shown in FIG. 5. The cable cut detection method of the present invention is adapted to be executed by the cable modem processor 124 of FIG. 4. Software or firmware implementing the method resides in one or more storage media devices (e.g., ROM 126, RAM 128, FLASH 130) connected to the processor. Alternatively, the software implementing the method may reside in internal storage within the processor itself.

With reference to FIGS. 4 and 5, a software process (that may execute in the background) continuously checks whether the cable modem is operating properly (step 150). If abnormal operation is detected, such as loss of synchronization or the occurrence of other events that should not normally occur are detected, then it is concluded that the cable modem is not operating properly. In that case, then the method moves to step 152 wherein a local variable 'x' is set to 1 (step 152). The processor then instructs the tuner 122 to tune to channel 'x' via a tune command signal 121 (step 154). Note that it is assumed that in this example embodiment, the cable modem is adapted to tune to all 128 DOCSIS channels (i.e. from 88 to 860 MHz).

The signal power (i.e. energy) received at the channel the tuner is currently tuned to (i.e. channel 'x') is them measured (step 155). Note that the signal power can be measured by the processor, the tuner itself or any other entity. If the detected signal power is greater than a threshold (step 156), the method returns to step 150, concluding that the RF cable was not cut. If, however, the measured signal power is less than the threshold (step 156), then the local variable 'x' is increments by one (x=x+1) (step 158). If all 128 channels have not been checked yet (step 160), then the method loops back to step 154 wherein the tuner is commanded to tune to the new channel 'x' (step 154). Note that in this example, the threshold is set to −20 dBmV. The threshold may be set statically or dynamically to a value higher or lower depending on the particular implementation and standard (if any) in use.

If the method loops through all 128 channels and the signal power measured on each channel is less than the threshold, then the processor instructs the SLIC 142 to shutdown the telephone line 144 (step 162). The SLIC can be shutdown via shutdown command signal 125 directly from the processor or in any other manner and is not critical to operation of the invention. Once the SLIC receives instructions or notice to shutdown (i.e. "no RF signal"), it removes the voltage normally present on the tip and ring lines of the standard 2-wire phone line. Shutting down the telephone line will be immediately sensed by the alarm system and in response it will trigger an alert (i.e. sound an audible alarm and/or attempt to communicate by a backup communication route, such via cellular phone, radio, etc.). In this manner, cuts to the RF cable (whether malicious or not) can be detected by the alarm system and responded to as they normally would if the alarm system were connected directly to the CO. Thus, moving the SLIC from the telephone company CO facilities to the cable modem box does not impose a penalty on the use of conventional alarm systems.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of detecting cuts in a radio frequency (RF) cable carrying a plurality of channels to a subscriber's premise, said method comprising the steps of:
    scanning each channel in said plurality of channels and measuring a signal power level thereof;
    concluding that a cut has occurred to the RF cable if the signal power level detected for each channel is below a threshold; and
    triggering an alert by indicating to a subscriber line interface card (SLIC) to shutdown telephone lines output therefrom.

2. The method according to claim 1, wherein said plurality of channels comprises Data Over Cable Service Interface Specification (DOCSIS) channels.

3. The method according to claim 1, wherein said plurality of channels comprises analog television channels.

4. The method according to claim 1, wherein said plurality of channels comprises digital television channels.

5. The method according to claim 1, wherein said threshold is less then or equal to −20 dBmV.

6. The method according to claim 1, wherein said telephone lines are shutdown by removing a normally applied voltage therefrom.

7. An apparatus for detecting cable cuts in a radio frequency (RF) cable carrying a plurality of channels to a subscriber's premises, said apparatus comprising:
    means for scanning each channel in said plurality of channels and measuring a signal power level thereof;
    means for generating an indication that a cut has occurred to the RF cable if the signal power level detected for each channel is below a threshold; and
    means for triggering an alert by shutting down telephone lines originating from a cable modem.

8. The apparatus according to claim 7, wherein said plurality of channels comprises 128 Data Over Cable Service Interface Specification (DOCSIS) channels.

9. The apparatus according to claim 7, wherein said plurality of channels comprises analog television channels.

10. The apparatus according to claim 7, wherein said plurality of channels comprises digital television channels.

11. The apparatus according to claim 7, wherein said threshold is less than or equal to −20 dBmV.

12. The apparatus according to claim 7, wherein said means for shutting down comprise means for removing a voltage normally applied to telephone lines originating from said cable modem in response to said cable cut.

13. A cable modem, comprising:
    a tuner coupled to an RF cable having a plurality of channels, said tuner operative to scan each channel in said plurality of channels;
    a subscriber line interference card (SLIC) operative to output conventional telephone signals onto a telephone line; and
    a cable modem processor coupled to said tuner and said SLIC, said cable modem processor operative to measure the signal power present on each channel and to generate a cable cut indication if the signal power level detected for each channel is below a threshold;
    wherein the subscriber line interface card (SLIC) is further operative to shutdown said telephone line in response to receipt of said cable cut indication.

14. The cable modem according to claim 13, wherein said plurality of channels comprises Data Over Cable Service Interface Specification (DOCSIS) channels.

15. The cable modem according to claim 13, wherein said plurality of channels comprises analog television channels.

16. The cable modem according to claim 13, wherein said plurality of channels comprises digital television channels.

17. The cable modem according to claim 13, wherein said threshold is less than or equal to −20 dBmV.

18. The cable modem according to claim 13, wherein said SLIC comprises means for shutting down said telephone line by removing a normally applied voltage therefrom.

* * * * *